United States Patent
Berger et al.

(10) Patent No.: US 8,143,754 B2
(45) Date of Patent: Mar. 27, 2012

(54) HYDROSTATIC ENERGY GENERATION UNIT

(75) Inventors: Jurgen Berger, Gerstetten (DE); Christoph Kirschinger, Heidenheim (DE); Stephan Bartosch, Rammingen (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 374 days.

(21) Appl. No.: 12/374,836

(22) PCT Filed: Aug. 3, 2007

(86) PCT No.: PCT/EP2007/006876
§ 371 (c)(1),
(2), (4) Date: Jan. 23, 2009

(87) PCT Pub. No.: WO2008/028546
PCT Pub. Date: Mar. 13, 2008

(65) Prior Publication Data
US 2009/0256452 A1      Oct. 15, 2009

(30) Foreign Application Priority Data
Sep. 8, 2006 (DE) .................. 10 2006 042 810

(51) Int. Cl.
*H02K 7/10* (2006.01)
(52) U.S. Cl. ........................ 310/75 R; 310/113
(58) Field of Classification Search ............... 310/75 R, 310/83, 113; 417/355, 366; 418/61.1; 290/1 R, 290/54; 60/398, 698
See application file for complete search history.

(56) References Cited

U.S. PATENT DOCUMENTS

| | | | | |
|---|---|---|---|---|
| 4,315,442 | A | * | 2/1982 | Cordner .................. 475/72 |
| 6,585,498 | B2 | * | 7/2003 | Arbogast et al. ........... 417/423.1 |
| 7,235,894 | B2 | * | 6/2007 | Roos ................... 290/54 |
| 2002/0172605 | A1 | | 11/2002 | Arbogast et al. |
| 2004/0219035 | A1 | | 11/2004 | Hundt et al. |

FOREIGN PATENT DOCUMENTS

| | | |
|---|---|---|
| DE | 9206881 U1 | 11/1993 |
| DE | 101 29 488 | 1/2003 |
| EP | 1 443 210 | 8/2004 |
| WO | 01/73295 | 10/2001 |

* cited by examiner

*Primary Examiner* — Quyen Leung
*Assistant Examiner* — Naishadh Desai
(74) *Attorney, Agent, or Firm* — Faegre Baker Daniels LLP

(57) ABSTRACT

The invention relates to a power generating unit, comprising an electric generator with a rotor; at least one hydrostatic motor for the powering of the electric generator, wherein at least one of the hydrostatic motors is constructed as an internal gear motor; the rotor of the electric generator surrounds the internal gear motor concentrically, wherein the rotor combs a pinion via an internal gearing, said pinion being driven at least indirectly by the internal gear motor; a starting device is allocated to the internal gear motor.

19 Claims, 2 Drawing Sheets

HYDROSTATIC ENERGY GENERATION UNIT

CROSS-REFERENCE TO RELATED APPLICATION

This application is related to and claims the benefit under 35 U.S.C. §119 and 35 U.S.C. §365 of International Application No. PCT/EP2007/006876, filed Aug. 3, 2007.

The invention relates to a hydrostatic power generating unit, in particular for use in vehicles.

Road and rail vehicles which are driven by means of an internal combustion engine require an electric generator for the generation of electrical auxiliary power for the operation of various electric components and actuators of the vehicle. Due to the varying speeds present during the traction operation of the internal combustion engine it is disadvantageous to power an electric generator directly via the internal combustion engine and because of it at variable speeds. From the state of the art it is known to use a hydrostatic drive unit for the propulsion of the electric generator, so that the internal combustion engine first drives a hydraulic pump which generates a volumetric flow of the working fluid for the driving of a hydrostatic engine, which in turn drives the electric generator. One possible embodiment is disclosed by DE 101 29 488 A1.

The known solutions for the coupling of a hydrostatic engine with a generator exhibit several disadvantages. For one thing, the tandem arrangements of the two components described in DE 101 29 488 A1 are large-scale. In addition the proposed unencapsulated operation of the hydraulic motor is very noise-intensive. Further the known solutions are distinguished by a mechanical coupling of the hydrostatic engine with the electric generator, which hinders the transfer of the working fluid used for the operation of the hydrostatic engine to the electric generator. An electric generator driven to such an extent requires an additional device for cooling, in particular for its windings, rectifier and power electronics, wherein these are ordinarily realized via a ventilator unit and with that via air cooling. These further components in turn increase the overall size of the unit.

The invention is based on the object of further developing an electric power generating unit of the initially named type in such a way that the most compact possible, space-saving unit arises which is distinguished by a low noise development and a good cooling capacity. Further the power generating unit should be configured to be simple in structure and manufacturing process.

For the solution of the task the inventors have recognized that an advantageous compact hydrostatic power generating unit exhibits an electric generator whose rotor coaxially surrounds the hydrostatic motor. This structural principle is known in accordance with WO 01/73295 A1 for motor pump aggregates, wherein however instead of an electric generator an electric motor is used and in place of the hydrostatic motor a pump designed in internal gear style is used. For coaxial surrounding of the internal gear pump the rotor of the electric motor is constructed U-shaped in the axial section, wherein on the wall side an internal gear is provided with which a pinion meshes, said pinion being connected to the pump shaft and thus driving the internal gear pump.

The motor pump aggregate known from WO 01/73295 A1 can also be used in the case of the usage of a hydrostatic motor instead of a hydrostatic pump and can be used in the case of the usage of an electric generator in place of an electromotor not immediately in a hydraulic circuit of a vehicle. The reason for this is the self-locking of internal gear motors in the region of the static friction as well as the problem resulting from this of the starting of such a hydrostatic power generating unit from standstill. The inventors have however recognized that a constructional unit of an internal gear motor with an electric generator whose rotor coaxially surrounds the internal gear motor can be connected to an additional starting device in constructively simple manner.

In the simplest case the electric generator itself is used as an additional starting device. If said starting device is constructed as a direct current synchronous generator, it is possible to supply power via a battery to the electric generator for starting of the unit for motor operation. However, particularly advantageous for the on-board power supply in vehicles is the design of the power generating unit with a brushless alternating current synchronous generator, which coaxially surrounds at least one hydrostatic motor. In the case of the usage of such a generator easy starting via battery power supply can be facilitated nevertheless by means of the installation of a direct current auxiliary winding. Furthermore it is possible to start such a power generator via corresponding frequency converter technology.

In a further design in addition to the coaxially arranged internal gear tooth a further hydrostatic motor is used, wherein then an especially compact structural unit arises when a rotatory drive is also used for the further hydrostatic motor and whose axis of rotation is constructed in alignment with that of the internal gear motor. As a result of this a structurally simple extension to the drive of the electric generator follows. By means of the second, further hydrostatic motor it is now possible to use such a hydrostatic drive as a supplement to the internal gear motor, said motor being distinguished by especially good starting properties. For example a piston engine can be used as such a low-speed engine. Through the second hydrostatic motor the possibility then exists of using said motor as an additional starting device, so that a starting up from a standing start is also possible without access to an additional power supply source to the motor operation of the electric generator. If a specified target engine speed is reached, the internal gear motor can be used for the normal operation, said motor distinguishing itself through a low noise emission due to the coaxial encapsulation through the rotor of the electric generator. In addition an embodiment is conceivable in which case the second, further hydrostatic motor is also encapsulated by the rotor of the electric generator.

A particularly advantageous starting device results in the case of the integration of a hydraulic rotary device into the power generating unit. Preferably the hydraulic rotary device comprises a rotary piston which in the case of the execution of an actuating movement enters into at least indirect operational connection to the rotating components of the hydrostatic motor. In this connection it is also possible that this operational connection takes place via the rotor of the generator coupled to the hydrostatic motor. The rotary piston will consequently push a rotating component of the power generating unit with the objective of overcoming the static friction in the internal gear motor and because of it to overcome its self-locking and thus to facilitate a starting of the hydrostatic motor. For this purpose the rotary piston will move in essence tangentially, linear relative to the rotating component used for the pushing.

A sliding body is integrated in the rotary piston, said body being able to be extended out of the rotary piston transversely to the actuating movement of said piston. For driving of the rotating component the sliding body in the course of the actuating movement of the rotary piston is brought into positive or frictional bearing contact with a peripheral region of the rotating component. In an advantageous embodiment a gear is provided on the peripheral region of the rotating component. Said gear can for one thing be constructed directly at the periphery of an end face of the rotating component. However, a design is conceivable in which a gear is provided on the front side in the region of the outer periphery of the rotating component.

By means of a corresponding embodiment of the end face of the sliding body said body will engage in the gearing in the course of the transversal, linear actuating movement of the rotary piston, as a result of which a driving of the rotating component and with it a pushing of the hydrostatic motor takes place. The transversal movement of the sliding body to the rotary piston can be effected by elastic elements, for example a spring. However, designs are also conceivable in which the sliding body is actively moved by means of an associated hydraulic or pneumatic actuating element in the direction of the contact surface on the rotating component in the course of the actuating movement of the rotary piston. Instead of a positive engagement of the end face of the sliding body on correspondingly formed counterparts of the rotating component, for example a gearing, the driving of the rotating component can take place through the movement of the sliding body also by means of frictional forces.

Particularly advantageous is a design in which case the rotary piston is constructed as a hydraulic piston and through pressurization with the working fluid used for driving of the hydrostatic motor. The extending movement of the rotating piston and with it the driving effect via the sliding body, which leads to the starting of the hydrostatic motor, will accordingly take place by a simple pressurization of the working fluid, without an additional control expenditure being necessary for this. As long as the pressure of the working fluid is maintained, the driving of the hydrostatic motor takes place. During this working interval the rotary piston will remain in an extended position which is not brought back to the initial position until the working fluid has become pressureless. Advantageously for this purpose an elastic spring for returning to the neutral position can be assigned to the rotary piston.

On the basis of the compact style due to the design the connection in accordance with the invention of a coaxially arranged hydrostatic motor and an electric generator and possible further additional hydrostatic motors arranged in axial alignment can be accommodated within a closed housing, in which the working fluid circulates for cooling, that is the electric generator is designed submerged. Such a construction further allows the use of the working fluid for cooling of the electronic components of the electric generator. Thus, for example the rectifier of a direct current synchronous machine and its windings can also be designed submerged, as a result of which an especially efficient heat removal is possible. From this the possibility results of constructing the electric components without a large-scale cooling body or additional devices for air cooling, as a result of which in turn a compact structural unit results.

The power generating unit is preferably designed in such a way that the electric generator is also submerged into the working fluid. Along with the improved cooling function one further advantage consists in the fact that in the case of the usage of hydraulic oil as a working fluid simultaneously the lubrication of the bearing components of the hydrostatic motor as well as of the electric generator is assured.

For simple construction it is further preferred that the bearing of the rotor of the electric generator is supported on the housing of the internal gear motor, as a result of which a unit both compact and simple in manufacturing process arises from a coaxially arranged hydrostatic motor and the electric generator surrounding said motor.

The hydrostatic power generating unit in accordance with the invention serves on the one hand the purpose of power generation for electric accessories in vehicles, on the other hand however it can also be used for the purpose of recovering electric power from the braking power of the vehicle, since the supply of the hydrostatic motor with pressurized working fluid can take place alternately from different drive sources. The use of at least two hydrostatic motors in the power generating unit, that means the use of an additional hydrostatic motor to the coaxially arranged internal gear motor, facilitates an advantageous embodiment in which the hydrostatic motors are supplied with working fluid from different sources and the supply-side hydraulic circuits provided for this purpose are separate from each other. Through this measure a separate hydraulic circuit can be driven from the delivery-side via braking power. Likewise it is possible to supply power to the hydrostatic power generator over a longer period of time from pressure feeders, which can also be charged again from braking power.

In the following an advantageous embodiment of the power generating unit in accordance with the invention will be presented using figures. The following is shown in detail:

Figure 1:
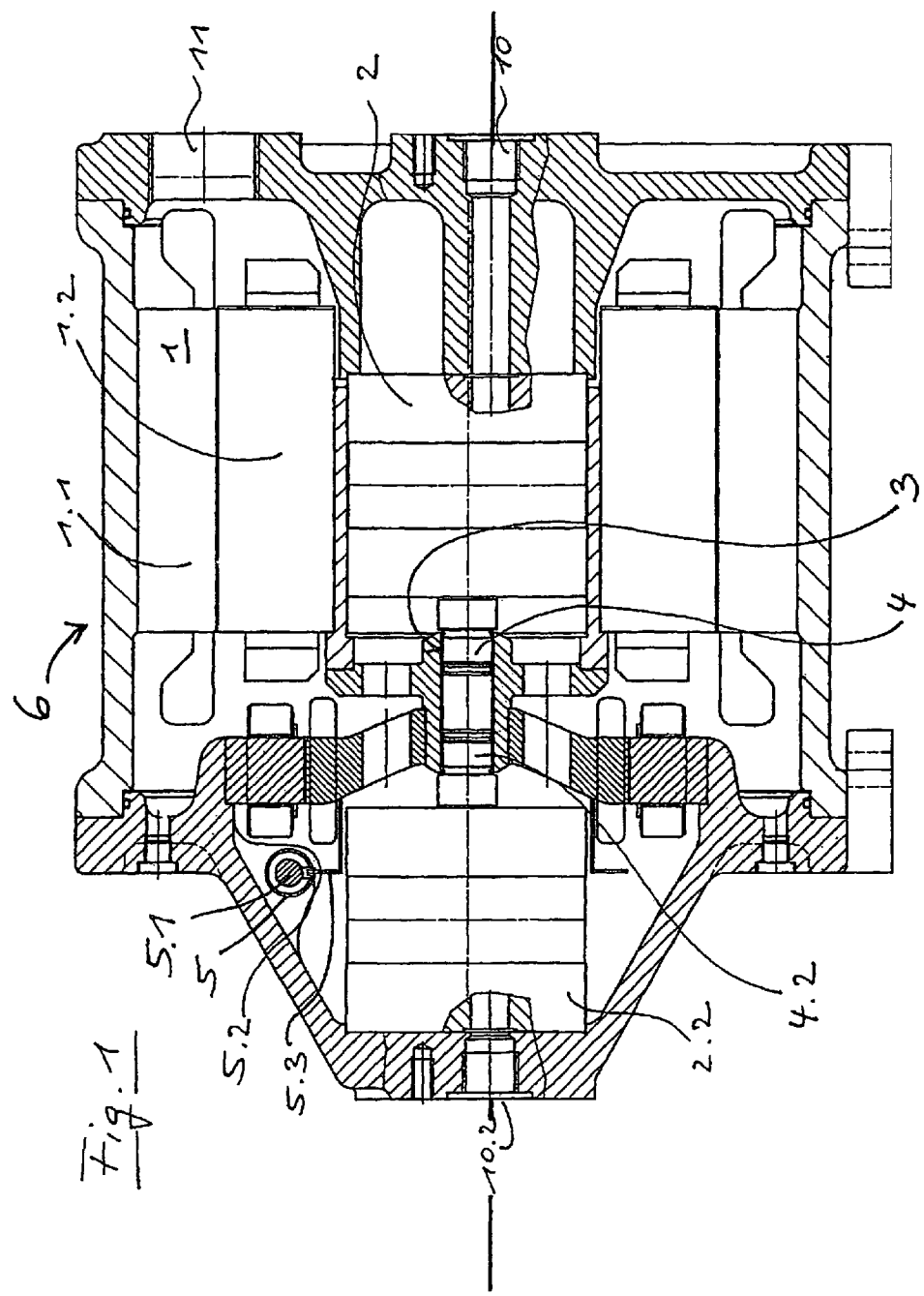
FIG. 1 shows an axial section through a power generating unit in accordance with the invention with two hydrostatic motors, which are constructed as internal gear motors.

FIG. 1 shows the power generating unit in accordance with the invention in axial section. In this connection the arrangement of the rotor 1.2 is depicted as an internal rotor to the stator 1.1 of the electric generator 1. Especially preferred is the use of a brushless, separately excited alternating current synchronous generator, wherein the unit 6 is used as the exciting machine. A hydrostatic motor arranged coaxially to the rotor 1.2 is used for the powering of the electric generator 1, said hydrostatic motor being constructed as an internal gear motor 2. In this connection the rotor 1.2 of the electric generator 1 surrounds the internal gear motor 2, which results in an especially compact and greatly noise reduced unit. The transfer of the drive power by the internal gear motor 2 takes place via a pinion 4 in alignment with the axis of rotation of the internal gear motor 2, said pinion meshing with an internal gearing 3 on the rotor 1.2 of the electric generator 1. As shown in FIG. 1, the encapsulation of the internal gear motor 2 takes place by an embodiment of the rotor 1.2 of the electric generator 1 that is U-shaped in the section, so that the internal gearing 3 is constructed in the region of the connecting rod of the two legs of the U-shaped part of the rotor 1.2 enveloping the internal gear motor 2. In accordance with an advantageous embodiment the rotor 1.2 of the electric generator is supported on the housing of the internal gear motor 2.

In accordance with a preferred embodiment the electric generator 1 including its exciting machine 6 submerges into the working fluid used for the powering of the hydrostatic motor 2. Along with the simplified lubrication of all rotating components of the power generating unit by the working fluid, an effective removal of the heat generated in the electric generator 1 also takes place. In particular in the case of an embodiment of the electric generator 1 as a brushless, separately excited alternating current synchronous generator the associated exciting machine 6 as well as the windings of the rotor 1.2 and of the stator 1.1 can be cooled in simple fashion by means of the working fluid. Because of this the necessity of constructing separate cooling bodies is omitted or said bodies can be designed compact, so that the power generating unit can be constructed correspondingly small-scale.

FIG. 1 shows further an exemplary embodiment of the power generating unit for which along with the internal gear motor 2 arranged coaxially to the electric generator 1 a further hydrostatic motor 2.2 is used. Said hydrostatic motor is arranged in alignment with regard to its axis of rotation to the first internal gear motor 2 and engages likewise the internal gearing in the rotor 1.2 By means of the duplicate construction of the hydrostatic drive it is possible to supply power to the power generating unit from two separate pressure fluid circuits.

If both hydrostatic motors 2, 2.2 are charged in an alternative embodiment with working fluid from the same pressure fluid circuit it is possible to construct the two hydrostatic motors differently, i.e. to use them for different speed ranges. In this connection one of the two hydrostatic motors can be used as part of a starting device by using a piston machine starting from a standing start instead of an internal gear motor. For the case that the two hydrostatic motors 2, 2.2 are charged from different pressure fluid circuits, it is conceivable to assign a memory unit to one of the two hydrostatic motors, for example a hydrostatic bubble memory which in turn is loaded in the case of a braking of the vehicle by a separate structural unit for power recycling. Accordingly the internal gear motor 2 and the second, further hydrostatic motor 2.2 are provided with separate intake openings 10, 10.2 for individual supplying of working fluid. With the embodiment shown in FIG. 1 a joint exhaust valve opening 11 is present for the working fluid.

In accordance with the invention a starting device 5 is used for the power generating unit for starting of the internal gear motor 2, which is surrounded by the rotor 1.2 of the electric generator. If a brushless, separately excited alternating current synchronous generator is used as the electric generator 1, a starting can be realized via frequency converters. Alternatively the electric generator 1 can be designed in such a way that by means of an additional direct current winding, which is supplied power via an additional power source, for example the battery, is started, as a result of which the internal gear motor 2 is pushed via the gear coupling.

In a further advantageous embodiment the starting takes place by the hydrostatics. This is advantageous because no additional control engineering is necessary as in the case of the starting via the electric generator; instead of this it is only necessary to place the working fluid under pressure. In accordance with a first embodiment variant the second, further hydrostatic motor is used for this purpose. In an especially preferred further design however a separate starting device 5 is provided which enters into at least indirect operational connection to the internal gear motor 2 encapsulated by the rotor 1.2 of the electric generator 1. For this purpose a hydraulic actuating element has proved to be particular advantageous, said element being able to execute a linear, transversal movement to a rotating component of the power generating unit.

In accordance with the embodiment shown in FIG. 1 a hydraulic actuating element, which is designated in the present application as rotary piston 5.1, is arranged in such a way that an extending movement of the same is in essence tangential to the rotational movement of the rotor 1.2. Integrated in the tappet of the rotary piston 5.1 a sliding body 5.2 is provided, which can be extended transversally relative to the axis of the rotary piston 5.1. This extending movement can take place actively via a pneumatic or hydraulic element or is realized in accordance with an advantageous embodiment by an elastic spring element. If the rotary piston 5.1 is pressurized by means of the working fluid, which is also used for powering the internal gear motor 2, an actuating movement follows which runs linear and transversally to a peripheral region of the rotor 1.2. For the embodiment shown in FIG. 1 in the course of this extending movement the sliding body 5.2 comes into bearing contact with the peripheral region of a flange 5.3 connected to the rotor 1.2 and drives said flange. This bearing contact can take place positively or frictionally, wherein the first variant is shown in FIG. 2.

Figure 2:
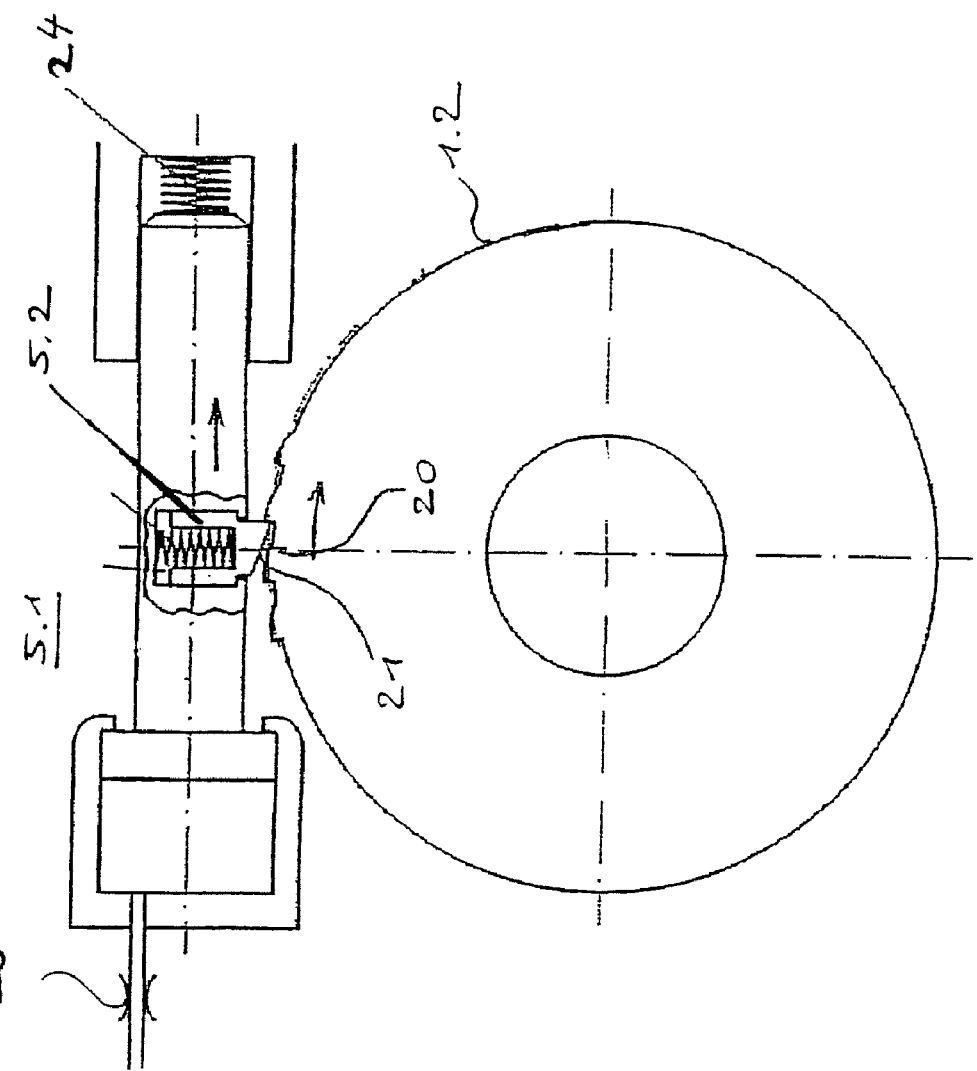
FIG. 2 shows the operating principle of a starting device which comprises a rotating piston with an integrated sliding body.

FIG. 2 shows in detail the rotary piston 5.1 and the integrated sliding body 5.2. In accordance with the shown embodiment a gearing 20 is present on the periphery of the rotor outer housing into which a beveled end face 21 of the sliding body 5.2 engages when it is brought by the actuating movement into the constriction between the gearing and the tappet. Through this operational engagement the rotor is rotated by the linear, transversal movement of the rotary piston 5.1, as a result of which also the internal gear motor 2 picks up a rotational movement. As a result of this the static friction is overcome to such an extent that a starting of the internal gear motor 2 is possible. In accordance with an advantageous embodiment then, as long as the pressure in the supply line for the working fluid is maintained during the following operational phase, the rotary piston 5.1 remains in an extended position and will only be brought back to its initial position after becoming pressureless through an elastic element, for example by means of the compression spring 24 shown in FIG. 1. This embodiment has the advantage that no control engineering is necessary to control the starting device 5. Advantageously only passive elements, like the throttle 25 shown in FIG. 2, in the supply line for the working fluid, are used to control the volumetric flow to the rotary piston. Consequently only the supply line for the operating fluid is exposed to pressure, as a result of which an actuating movement of the rotary piston and a driving of the rotor 1.2 and with it an indirect rotation of the hydrostatic motor follows. As a result of this the static friction is overcome and in consequence the internal gear motor can be used as a drive of the electric generator 1.

The invention claimed is:

1. A power generating unit, comprising:
an electric generator with a rotor;
at least one hydrostatic motor for the powering of the electric generator, wherein at least one of the hydrostatic motors is constructed as an internal gear motor; and
the rotor of the electric generator surrounds the internal gear motor concentrically, wherein the rotor meshes with a pinion via an internal gearing, said pinion being driven at least indirectly by the internal gear motor;
wherein a starting device is connected in the power generating unit for starting of the internal gear motor.

2. A power generating unit, comprising:
an electric generator with a rotor;
at least one hydrostatic motor for the powering of the electric generator, wherein at least one of the hydrostatic motors is constructed as an internal gear motor; and
the rotor of the electric generator surrounds the internal gear motor concentrically, wherein the rotor meshes with a pinion via an internal gearing, said pinion being driven at least indirectly by the internal gear motor;
wherein a starting device is connected in the power generating unit for starting of the internal gear motor; and
wherein in addition to the internal gear motor a further hydrostatic motor is used, wherein the further hydrostatic motor is a rotary drive whose axis of rotation is in alignment with that of the internal gear motor.

3. The power generating unit according to claim 2, wherein the further hydrostatic motor is used as the starting device of the electric generator.

4. A power generating unit, comprising:
an electric generator with a rotor;
at least one hydrostatic motor for the powering of the electric generator, wherein at least one of the hydrostatic motors is constructed as an internal gear motor; and
the rotor of the electric generator surrounds the internal gear motor concentrically, wherein the rotor meshes with a pinion via an internal gearing, said pinion being driven at least indirectly by the internal gear motor;
wherein a starting device is connected in the power generating unit for starting of the internal gear motor; and
further wherein the electric generator is operated as a motor.

5. A power generating unit, comprising:
an electric generator with a rotor;
at least one hydrostatic motor for the powering of the electric generator, wherein at least one of the hydrostatic motors is constructed as an internal gear motor; and
the rotor of the electric generator surrounds the internal gear motor concentrically, wherein the rotor meshes with a pinion via an internal gearing, said pinion being driven at least indirectly by the internal gear motor;
wherein a starting device is connected in the power generating unit for starting of the internal gear motor; and
wherein a rotary piston moved with the working fluid for the driving of the internal gear motor with a sliding body transversally movable to said rotary piston is used as the starting device, wherein in the case of an actuating movement of the rotary piston the sliding body is brought into a positive or frictional contact to a rotating component of the power generating unit whose driving and torsion lead to a rotational movement of the internal gear motor.

6. The power generating unit according to claim 1, wherein a synchronous generator is used as the electric generator.

7. A power generating unit, comprising:
an electric generator with a rotor;
at least one hydrostatic motor for the powering of the electric generator, wherein at least one of the hydrostatic motors is constructed as an internal gear motor; and
the rotor of the electric generator surrounds the internal gear motor concentrically, wherein the rotor meshes with a pinion via an internal gearing, said pinion being driven at least indirectly by the internal gear motor;
wherein a starting device is connected in the power generating unit for starting of the internal gear motor; and
wherein a brushless, separately excited alternating current synchronous generator integrated in the power generating unit is used as the electric generator.

8. A power generating unit, comprising:
an electric generator with a rotor;
at least one hydrostatic motor for the powering of the electric generator, wherein at least one of the hydrostatic motors is constructed as an internal gear motor; and
the rotor of the electric generator surrounds the internal gear motor concentrically, wherein the rotor meshes with a pinion via an internal gearing, said pinion being driven at least indirectly by the internal gear motor;
wherein a starting device is connected in the power generating unit for starting of the internal gear motor; and
wherein the working fluid for the driving of the internal gear motor is used for the cooling of the electric generator and its power electronics.

9. A power generating unit, comprising:
an electric generator with a rotor;
at least one hydrostatic motor for the powering of the electric generator, wherein at least one of the hydrostatic motors is constructed as an internal gear motor; and
the rotor of the electric generator surrounds the internal gear motor concentrically, wherein the rotor meshes with a pinion via an internal gearing, said pinion being driven at least indirectly by the internal gear motor;
wherein a starting device is connected in the power generating unit for starting of the internal gear motor; and
wherein the working fluid for the driving of the internal gear motor is used for the lubrication of the bearing components of the power generating unit.

10. The power generating unit according to claim 1, wherein the rotor of the electric generator is supported on the housing of the internal gear motor.

11. The power generating unit according to claim 2, wherein the internal gear motor and the further hydrostatic motor are supplied with working fluid by separate supply circuits.

12. The power generating unit according to claim 2, wherein the electric generator is operated as a motor.

13. The power generating unit according to claim 2, wherein a rotary piston moved with the working fluid for the driving of the internal gear motor with a sliding body transversally movable to said rotary piston is used as the starting device, wherein in the case of an actuating movement of the rotary piston the sliding body is brought into a positive or frictional contact to a rotating component of the power generating unit whose driving and torsion lead to a rotational movement of the internal gear motor.

14. The power generating unit according to claim 2, wherein a synchronous generator is used as the electric generator.

15. The power generating unit according to claim 2. wherein the working fluid for the driving of the internal gear motor is used for the cooling of the electric generator and its power electronics.

16. The power generating unit according to claim 3, wherein the working fluid for the driving of the internal gear motor is used for the lubrication of the bearing components of the power generating unit.

17. The power generating unit according to claim 2, wherein the rotor of the electric generator is supported on the housing of the internal gear motor.

18. The power generating unit according to claim 3, wherein the rotor of the electric generator is supported on the housing of the internal gear motor.

19. The power generating unit according to claim 4, wherein the rotor of the electric generator is supported on the housing of the internal gear motor.

* * * * *